(12) United States Patent
Israel et al.

(10) Patent No.: US 11,585,991 B2
(45) Date of Patent: Feb. 21, 2023

(54) FIBERLESS CO-PACKAGED OPTICS

(71) Applicant: Teramount Ltd., Jerusalem (IL)

(72) Inventors: Abraham Israel, Jerusalem (IL);
Hesham Taha, Jerusalem (IL)

(73) Assignee: Teramount Ltd., Jerusalem (IL)

( * ) Notice: Subject to any disclaimer, the term of this patent is extended or adjusted under 35 U.S.C. 154(b) by 0 days.

(21) Appl. No.: 16/801,682

(22) Filed: Feb. 26, 2020

(65) Prior Publication Data
US 2020/0278508 A1  Sep. 3, 2020

Related U.S. Application Data

(60) Provisional application No. 62/811,840, filed on Feb. 28, 2019.

(51) Int. Cl.
| | | |
|---|---|---|
| *G02B 6/42* | (2006.01) | |
| *G02B 6/38* | (2006.01) | |
| *G02B 6/30* | (2006.01) | |

(52) U.S. Cl.
CPC ........... *G02B 6/4214* (2013.01); *G02B 6/423* (2013.01)

(58) Field of Classification Search
None
See application file for complete search history.

(56) References Cited

U.S. PATENT DOCUMENTS

| | | |
|---|---|---|
| 4,744,618 A | 5/1988 | Mahlein |
| 4,763,977 A | 8/1988 | Kawasaki et al. |
| 5,913,002 A | 6/1999 | Jiang |
| 5,939,782 A | 8/1999 | Malladi |
| 6,122,417 A | 9/2000 | Jayaraman et al. |
| 6,198,864 B1 | 3/2001 | Lemoff et al. |
| 6,271,970 B1 | 8/2001 | Wade |
| 6,600,845 B1 | 7/2003 | Feldman et al. |
| 6,801,693 B1 | 10/2004 | Jacobowitz et al. |
| 6,832,031 B2 | 12/2004 | Smaglinski |

(Continued)

FOREIGN PATENT DOCUMENTS

| | | |
|---|---|---|
| CA | 1253377 A | 5/1989 |
| CN | 1387626 A | 12/2002 |

(Continued)

OTHER PUBLICATIONS

Barwicz, et al., "Assembly of Mechanically Compliant Interfaces Between Optical Fibers and Nanophotonic Chips", IEEE 64th Electronics Components and Technology Conference, Orlando, FL, May 27-30, 2014.

(Continued)

*Primary Examiner* — Michelle R Connelly
(74) *Attorney, Agent, or Firm* — Banner & Witcoff, Ltd.

(57) ABSTRACT

An electro-optical system, and method for making the electro-optical system. The electro-optical system includes a Photonic Integrated Circuit (PIC) having a laser source located on the PIC, a fiberless optical coupler located on the PIC. The fiberless optical coupler is configured to be coupled to a fiber array. The electro-optical system also includes an optical element, and a mechanical aligner. The optical element is aligned with the fiber array, via the mechanical aligner, for a light from the laser source to transmit in between the fiber array and the PIC through the optical element, when the fiberless optical coupler is coupled to the fiber array.

17 Claims, 10 Drawing Sheets

(56) References Cited

U.S. PATENT DOCUMENTS

| | | |
|---|---|---|
| 6,862,092 B1 | 3/2005 | Ibsen et al. |
| 6,888,988 B2 | 5/2005 | Vancoille et al. |
| 6,941,047 B2 | 9/2005 | Capewell et al. |
| 6,960,031 B2 | 11/2005 | McFarland et al. |
| 7,050,304 B2 | 5/2006 | Hsu et al. |
| 7,058,275 B2 | 6/2006 | Sezerman et al. |
| 7,139,448 B2 | 11/2006 | Jain et al. |
| 7,260,328 B2 | 8/2007 | Kropp |
| 7,288,756 B2 | 10/2007 | Sherrer et al. |
| 7,317,746 B2 | 1/2008 | Ericson et al. |
| 7,358,109 B2 | 4/2008 | Gallup et al. |
| 7,447,404 B2 | 11/2008 | Miller |
| 7,853,101 B2 | 12/2010 | Carothers |
| 7,970,041 B2 | 6/2011 | Arimoto et al. |
| 3,000,565 A1 | 8/2011 | Liu |
| 8,117,982 B2 | 2/2012 | Gruber et al. |
| 8,390,806 B1 | 3/2013 | Subramanian |
| 8,422,836 B2 * | 4/2013 | Riester ............... G02B 6/4214 385/14 |
| 8,471,467 B2 | 6/2013 | Boemer |
| 8,548,287 B2 | 10/2013 | Thacker et al. |
| 8,582,934 B2 | 11/2013 | Adler et al. |
| 8,803,269 B2 | 8/2014 | Shastri et al. |
| 8,834,146 B2 | 9/2014 | Saha et al. |
| 8,836,942 B2 | 9/2014 | Quan et al. |
| 8,929,693 B2 | 1/2015 | Shin et al. |
| 9,039,304 B2 | 5/2015 | Ko et al. |
| 9,099,581 B2 | 8/2015 | Na et al. |
| 9,285,554 B2 | 3/2016 | Doany et al. |
| 9,429,725 B2 | 8/2016 | Shao et al. |
| 9,442,255 B2 | 9/2016 | Pommer et al. |
| 9,496,248 B2 | 11/2016 | Lee et al. |
| 9,500,821 B2 | 11/2016 | Hochberg et al. |
| 9,563,028 B2 * | 2/2017 | Contag ............... G02B 6/423 |
| 9,698,564 B1 * | 7/2017 | Shubin ............... H01S 5/026 |
| 9,703,041 B2 | 7/2017 | Smith et al. |
| 9,791,645 B2 | 10/2017 | Meadowcroft et al. |
| 9,804,334 B2 | 10/2017 | Israel et al. |
| 9,804,348 B2 | 10/2017 | Badihi et al. |
| 9,864,133 B2 | 1/2018 | Patel et al. |
| 9,874,688 B2 | 1/2018 | Doerr et al. |
| 9,946,028 B2 | 4/2018 | Chen et al. |
| 10,222,552 B2 | 3/2019 | Djordjevic et al. |
| 10,481,334 B2 | 11/2019 | Israel et al. |
| 10,866,363 B2 | 12/2020 | Israel et al. |
| 2002/0118907 A1 | 8/2002 | Sugama et al. |
| 2002/0131180 A1 | 9/2002 | Goodman |
| 2002/0164129 A1 | 11/2002 | Jackson |
| 2003/0002809 A1 | 1/2003 | Jian |
| 2003/0043157 A1 | 3/2003 | Miles |
| 2003/0142896 A1 | 7/2003 | Kikuchi et al. |
| 2004/0184704 A1 | 9/2004 | Bakir et al. |
| 2005/0025430 A1 | 2/2005 | Bhagavatula et al. |
| 2005/0276613 A1 | 12/2005 | Welch et al. |
| 2006/0251360 A1 * | 11/2006 | Lu ............... G02B 6/43 385/88 |
| 2009/0178096 A1 | 7/2009 | Menn et al. |
| 2009/0262346 A1 | 10/2009 | Egloff et al. |
| 2010/0002987 A1 | 1/2010 | Hata et al. |
| 2011/0032598 A1 | 2/2011 | Horikawa et al. |
| 2011/0091167 A1 | 4/2011 | Nishimura |
| 2011/0280573 A1 | 11/2011 | Collings et al. |
| 2011/0293281 A1 | 12/2011 | Sakurai |
| 2012/0002284 A1 | 1/2012 | McColloch et al. |
| 2012/0063721 A1 | 3/2012 | Chen |
| 2012/0280344 A1 | 11/2012 | Shastri et al. |
| 2013/0044977 A1 | 2/2013 | Amit |
| 2013/0109083 A1 | 5/2013 | Adan |
| 2013/0129281 A1 | 5/2013 | Son et al. |
| 2014/0023098 A1 | 1/2014 | Clarkson et al. |
| 2014/0064559 A1 | 3/2014 | Sugasawa et al. |
| 2014/0203175 A1 * | 7/2014 | Kobrinsky ............... H01L 24/83 250/214.1 |
| 2014/0226988 A1 | 8/2014 | Shao et al. |
| 2014/0363165 A1 | 12/2014 | Panotopoulos et al. |
| 2015/0050019 A1 | 2/2015 | Sengupta |
| 2015/0124336 A1 | 5/2015 | Kaufman |
| 2016/0161686 A1 | 6/2016 | Li et al. |
| 2016/0195677 A1 | 7/2016 | Panotopoulos et al. |
| 2016/0377821 A1 * | 12/2016 | Vallance ............... G02B 6/124 385/28 |
| 2017/0102503 A1 * | 4/2017 | Israel ............... G02B 6/4246 |
| 2017/0160481 A1 | 6/2017 | Ling et al. |
| 2017/0207600 A1 * | 7/2017 | Klamkin ............... H01S 5/142 |
| 2018/0031791 A1 | 2/2018 | Israel et al. |
| 2018/0045891 A1 * | 2/2018 | Israel ............... G02B 6/3692 |
| 2018/0180829 A1 | 6/2018 | Gudeman |
| 2018/0217341 A1 | 8/2018 | Smith et al. |
| 2018/0259710 A1 | 9/2018 | Stabile et al. |
| 2018/0364426 A1 * | 12/2018 | ten Have ............... G02B 6/423 |
| 2019/0265421 A1 * | 8/2019 | Ji ............... G02B 6/4214 |
| 2019/0324211 A1 * | 10/2019 | Israel ............... G02B 6/305 |

FOREIGN PATENT DOCUMENTS

| | | |
|---|---|---|
| CN | 104459890 A | 3/2015 |
| EP | 2639978 A1 | 9/2013 |
| EP | 3316012 A1 | 5/2018 |
| KR | 20170081265 A | 7/2017 |
| RU | 2438209 C1 | 12/2011 |
| RU | 2485688 C2 | 6/2013 |
| RU | 2577669 C2 | 3/2016 |
| WO | 2001067497 A1 | 9/2001 |
| WO | 2013048730 A1 | 4/2013 |
| WO | 2018140057 A1 | 8/2018 |

OTHER PUBLICATIONS

Bogaerts, "Helios Lecture: Coupling Light to Silicon Photonic Circuits", Silicon Photonics—PhD Course prepared within FP7-224312 Helios Project, Ghent University-IMECGhent, Belgium, Nov. 2009.

Chrical Photonics., "Fiber Coupler Overview", Pinebrook, NJ, Jan. 2013.

Cunningham, et al., "Aligning Chips Face-to-Face for Dense Capacitive and Optical Communications", IEEE Transactions on Advanced Packaging, vol. 33, No. 2, May 2010.

First Chinese Foreign Office Action for Chinese Application No. 201980025948 3, Chinese National Intellectual Property Administration (CNIPA), Beijing City, China, dated Nov. 15, 2021.

Foreign Office Action and Search Report for ROC (Taiwan) Patent Application No. 105121625 dated Sep. 5, 2017 from IPO (Intellectual Property Office) of Taiwan.

Hou, et al., "Physics of Elliptical Reflectors at Large Reflection and Divergence Angles I: Their Design for NanoPhotonic Integrated Circuits and Application to Low-loss Low-crosstalk Waveguide Crossing", Northwestern University, Evanston, IL., Apr. 2012.

International Search Report and Written Opinion of Internationl Searching Authority for PCT/US2019/027871, ISA/RU, Moscow, Russia, dated Aug. 22, 2019.

Kopp, et al., "Silicon Photonic Circuits: On-CMOS Integration, Fiber Optical Coupling, and Packaging", IEEE Journal of Selected Topics in Quantum Electronics, Aug. 2010.

Kurata, et al., "Prospect of Chip Scale Silicon Photonics Transceiver for High Density Multi-mode Wiring System", Photonics Electronics Technology Research Association (PETRA), Japan, 2015, pp. 1-7.

Nguyen, et al., "Silicon-based Highly-efficient Fiber-to-waveguide Coupler for High Index Contrast Systems", Applied Physics Letters, American Institute of Physics, downloaded Feb. 29, 2012, published online Feb. 24, 2006.

Notice of Deficiencies for EP Application No. 16854021.9 dated Jun. 24, 2019, EPO, Rijswijk, Netherlands.

O'Brien, "Silicon Photonics Fiber Packaging Technology", Photonics Packaging Group, Tyndall National Institute, Cork, Yeland, Sep. 2012.

PCL Connections LLC, all rights reserved, "In-Line Coupling Element (ICE) for Bonded Grating Coupling to Silicon PICs", Columbus, OH., May 2013.

(56) References Cited

OTHER PUBLICATIONS

The European Search Report for EP Application No. 16854021.9 dated Aug. 21, 2018, EPO, The Hague.
The First Chinese Office Action for Chinese Patent Application No. 2016800557192, Aug. 22, 2019, China, CNIPA.
The International Search Report and The Written Opinion for PCT/US2016/038047, ISA/RU, Moscow, Russia, dated Oct. 13, 2016.
The International Search Report and The Written Opinion for PCT/US2017/055146, ISA/RU, Moscow, Russia, dated Jan. 31, 2018.
Zimmerman, "State of the Art and Trends in Silicon Photonics Packaging", Silicon Photonics Workshop, Technische Jniversitat Berlin, May 2011.
Second Chinese Foreign Office Action for Chinese Application No. 2019800259483, Chinese National Intellectual Property Administration (CNIPA), Beijing City, China, dated May 31, 2022.

* cited by examiner

FIBERLESS CO-PACKAGED OPTICS

CROSS-REFERENCE TO RELATED APPLICATIONS

This application claims the benefit of U.S. Provisional Application No. 62/811,840 filed on Feb. 28, 2019, the contents of which are hereby incorporated by reference.

TECHNICAL FIELD

The present disclosure relates generally to coupling an optical fiber to a substrate, and more particularly to coupling the optical components to an optoelectronic Integrated Circuit (IC).

BACKGROUND

Communications systems and data centers are required to handle massive data at ever increasing speeds and ever decreasing costs. To meet these demands, optical fibers and optical ICs (such as, a Photonic Integrated Circuit (PIC) or integrated optical circuit) are used together with high speed electronic ICs. A PIC is a device that integrates multiple photonic functions (similar to an electronic IC or RF IC). PICs are typically fabricated using indium phosphide or silicon oxide ($SiO_2$), which allows for the integration of various optically active and passive functions on the same circuit.

The coupling of PICs to optical fibers is not as well advanced as the integration and/or coupling of electronic ICs. Specifically, the challenges facing optical connections are different and much more complex than connecting electronic ICs to, for example, a Printed Circuit Board (PCB). Some difficulties are inherent in wavelength, signal losses, assembly tolerance, and polarization characteristics of optical packaging.

Existing solutions utilize various techniques for connecting optical fibers to PICs. One technique suggests using various types of butt connections to the edge and surface fiber connections a PIC. The butt of a fiber can be connected to a planar waveguide at the edge of a PIC. This technique is efficient only if the cross sectional of the propagating mode of the fiber and the waveguide areas of the fiber core and the waveguide are of similar size. In most cases, this technique suffers from poor assembly tolerance and is not suitable for high fiber-port count.

An existing technique suggests laying a section of fiber on top of the surface of the PIC where the end of the fiber has been cut at an angle to form an angled tip. The angled tip has a flat surface, which reflects a light beam down to a waveguide grating coupler disposed on the integrated circuit. The light beam is reflected off the reflective surface of the angled tip by total internal reflection. The waveguide grating coupler is designed to accept the slightly diverging light beam from the reflective surface of the angled tip of the fiber. The light beam can also propagate through the fiber to a chip coupler in the opposite direction, up from the substrate through the waveguide grating and into an optical fiber after bouncing off the reflective surface of the angled tip. This technique further requires coating on the exterior of the reflective surface with epoxy.

Among others, all of the above-noted techniques require precise alignment and active positioning of the optical fiber to the PIC. As such, current techniques suffer from poor and very tight alignment tolerance to gain an efficient connectivity. For example, a misalignment between an optical fiber and a PIC of 1-2 microns would result in a signal loss of about 3 db. Furthermore, the alignment is now performed with expensive equipment or labor-intensive assembly solutions. As a result, mass production of PICs and/or optical couplers is not feasible. Furthermore, most current Single Mode (SM) fiber-chip connection uses non-scalable assembly technologies due to active-alignment protocols. Such protocols support low volume production and cannot be scaled to application with large port count. For example, data-center switches with high density and chip-to-chip connectivity applications are not supported by the active-alignment protocol.

Furthermore, current wide-band optical fiber to chip connectivity uses complicated edge coupling geometry and sub-micron tight tolerance, which mostly requires active alignment of specialized tools.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include an electro-optical system. The electro-optical system includes a Photonic Integrated Circuit (PIC) having a laser source located on the PIC, a fiberless optical coupler located on the PIC. The fiberless optical coupler is configured to be coupled to a fiber array. The electro-optical system also includes an optical element, and a mechanical aligner. The optical element is aligned with the fiber array, via the mechanical aligner, for a light from the laser source to transmit in between the fiber array and the PIC through the optical element, when the fiberless optical coupler is coupled to the fiber array.

Certain embodiments disclosed herein also include a method of manufacturing the electro-optical system. The method includes forming a Photonic Integrated Circuit (PIC), the PIC having a laser source formed on the PIC, forming an optical element, forming a mechanical aligner, coupling the PIC on a Multi-Chip Module (MCM), coupling the MCM on a Printed Circuit Board (PCB), and coupling a fiberless optical coupler to the PIC, the fiberless optical coupler configured to be coupled to a fiber array. The optical element is aligned with the fiber array via the mechanical aligner, for a light from the laser source to transmit in between the fiber array and the PIC through the optical element, when the fiberless optical coupler is coupled to the optical connector via the mechanical aligner.

BRIEF DESCRIPTION OF THE DRAWINGS

The subject matter disclosed herein is particularly pointed out and distinctly claimed in the claims at the conclusion of the specification. The foregoing and other objects, features.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Based on the problems stated above, a scalable single-mode fiber to chip assembling methodology is needed in applications where fiber high density or large port count is used, for example, co-packaged optical Switch connectivity. Co-packaged optical connectivity brings multiple fibers closer to Switch die which is packaged on an expensive packaging platform such as a Multi-Chip Module (MCM). Therefore, co-packaged optical connectivity should be compatible with standard chip packaging methodologies and equipment. Separating the fiber from the MCM packaging steps, and keeping the fiber and MCM packaging to the last stage in a pluggable way is not only unique, but also makes the process a scalable technology.

Furthermore, fiberless detachable connections are suitable not only in switches, but also in transceivers and other applications such as connections between memory and processors and chip-to-chip connectivity in general.

According to some embodiments, an electro-optical interconnection platform for co-packaging a high-speed switch to high-density optical engine is disclosed. In an embodiment, the platform includes a fiberless optical coupler that may cover various geometries. The coupler includes a plurality of mirrors, one or more mechanical aligners for fiber mount connector, that are rods located in V-grooves, which are accurately placed relative to the optics, and a waveguide (e.g., a polymeric waveguide or other types of mirror with different optical arrangements). In an example embodiment, the chip includes a plurality of mirrors, and a positive tapered wave guide, an interface medium, (e.g., MCM), and a high-speed switch's die. In an example embodiment, a laser can be part of the platform.

In yet another embodiment, a fiberless optical coupler for interfacing with an optical fiber connector and a Photon Integrated Circuit (PIC) is disclosed. The coupler includes a plurality of mirrors, one or more mechanical alignment rods, and a waveguide, (e.g., a polymeric or Si waveguide).

Figure 1:
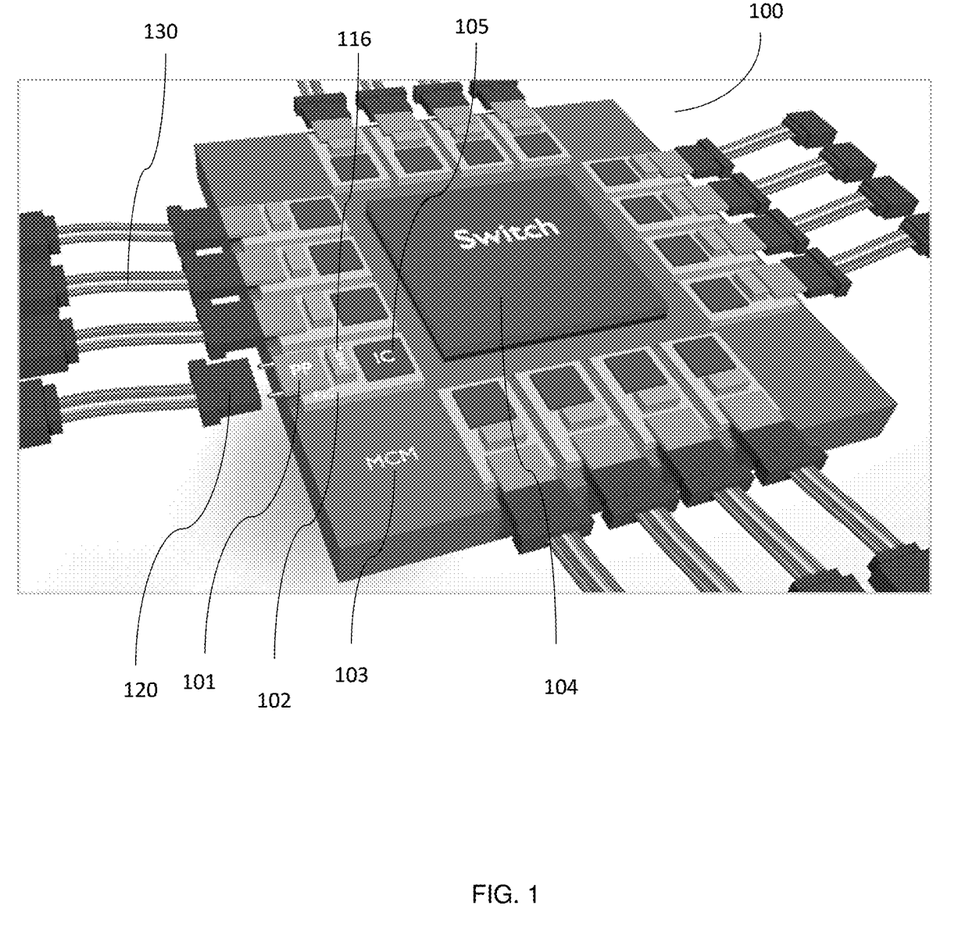
FIG. 1 is a top view of the electro-optical interconnection platform for co-packaging a high-speed switch to high-density optical engine showing the position of the fiberless optical coupler according to some embodiments.

FIG. 1 is a top view of an electro-optical interconnection platform 100 according to an embodiment. The platform 100 includes a fiberless optical coupler 101 (also known as fiberless Photonic Plug (PP) coupler), an Integrated Circuit (IC) 105, and a laser source 116 packaged on a PIC 102 (also known as a photonic chip or high-density optical engine), and a high-speed switch's die 104 co-packaged with the PIC 102 as a set of electronic components on an MCM 103.

The fiberless optical coupler 101 is designed with an optical arrangement that provides high tolerance alignment and a passive positioning of the fiberless optical coupler, thus aligning the optical fiber with respect to the PIC. An example optical arrangement of the coupler 101 can be found in U.S. Pat. No. 9,840,334 and U.S. patent application Ser. No. 14/878,591, each of which are herein incorporated by reference in their entirety and assigned to the common assignee. The fiberless optical coupler 101 can be mass-produced and its design further allows for compact and secured packaging of PICs.

In an embodiment, multiple sets of the fiberless optical coupler 101, the PIC 102, the IC 105 and the laser source 116 are assembled surrounding the high-speed switch die 104 on the MCM 103.

Each of the fiberless optical coupler 101 may be connected to electrical-optical connectors 120 and the fiber array 130 to transmit power or data to the components mounted on the MCM 103, the details of which will be further discussed below. Also, the fiberless optical coupler 101 is assembled on the PIC 102 through a flip-chip machine (not shown) with passive alignment and large tolerances using "self-aligning optics". Such alignment does not require additional adjustments or alignment of the optical components are necessary, and accurate placement of mechanical aligners with reference to optics at wafer level sizes are enabled. The details of the "self-aligning optics" are explained below with reference to FIGS. 4 through 7.

It should be appreciated that by using the flip-chip machine using self-aligning optics, surface coupling may be achieved, and issues with complicated edge geometry may be removed.

Figure 2:
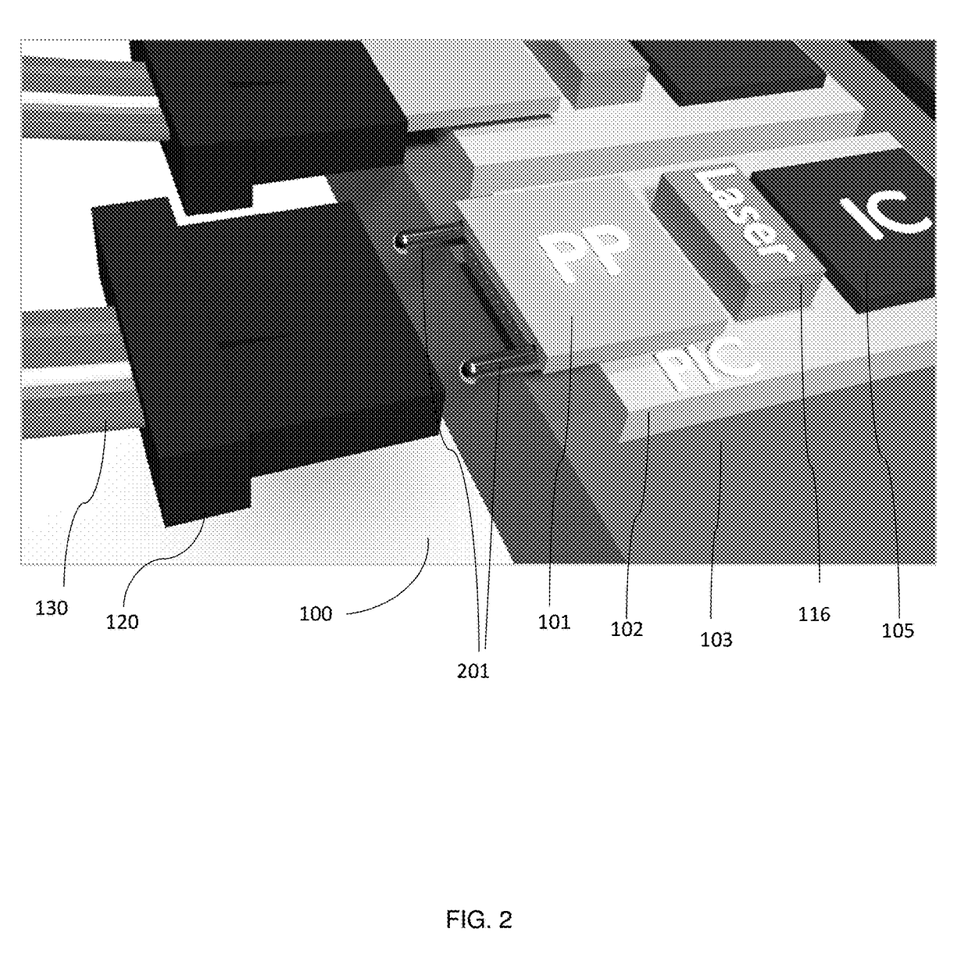
FIG. 2 is a magnified view of the electro-optical interconnection platform according to some embodiments.

FIG. 2 is an example magnified view of the electro-optical interconnection platform 100 according to an embodiment. In one embodiment, the fiberless optical coupler 101 includes a mechanical aligner 201 that is compatible with various types of electrical optical connectors 120 that ensure mechanical alignment of fiber ribbon relative to the optics on the fiberless optical coupler 101.

In another embodiment, the mechanical aligner 201 may be a pair of cylindrical rods arranged on opposite sides of the fiberless optical coupler 101 at a distal end, both of which are connectible to the electrical optical connectors 120. The pair of cylindrical rods may be parallel to each other and be of the same length. The assembly of the electro-optical interconnection platform 100 can be performed by connecting the fiberless optical coupler 101 on the MCM module 103 to a switch board (not shown).

Figure 3:
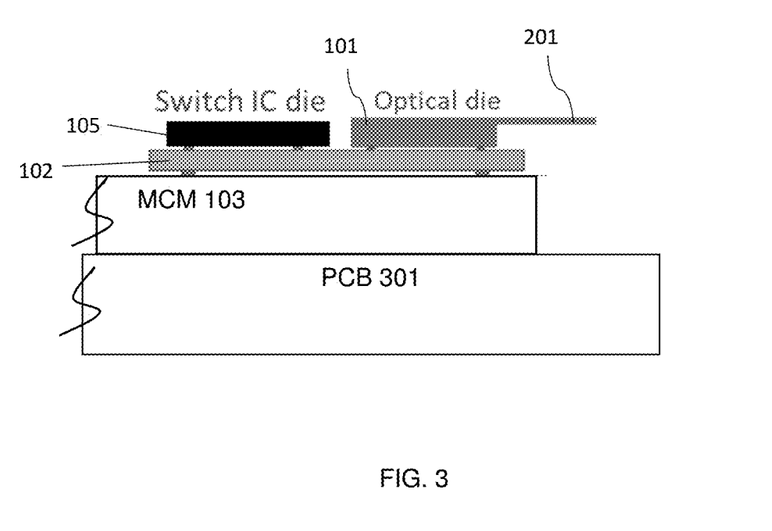
FIG. 3 is a side schematic view of the electro-optical interconnection platform according to some embodiments.

FIG. 3 is an example schematic side view of the electro-optical interconnection platform 100 according to an embodiment. The fiberless optical coupler 101, which is also known as an optical die and includes the mechanical aligner 201, is mounted on the PIC 102 adjacent to the IC 105, which is also known as the switch IC die. The PIC 102 is in turn mounted on the MCM module 103, and the entire assembly including the fiberless optical coupler 101, the mechanical aligner 201, IC 105, PIC 102, and the MCM module 103 is mounted on a printed circuit board (PCB) 301.

As shown in the example FIG. 3, the co-packaged components reduce power consumption, as this arrangement brings the components closer to the IC 105, thereby reducing the electrical port's length to about 2-3 millimeters, compared to the 10-15 centimeters electrical link seen in typical pluggable transceiver optics connectivity.

Figure 4:
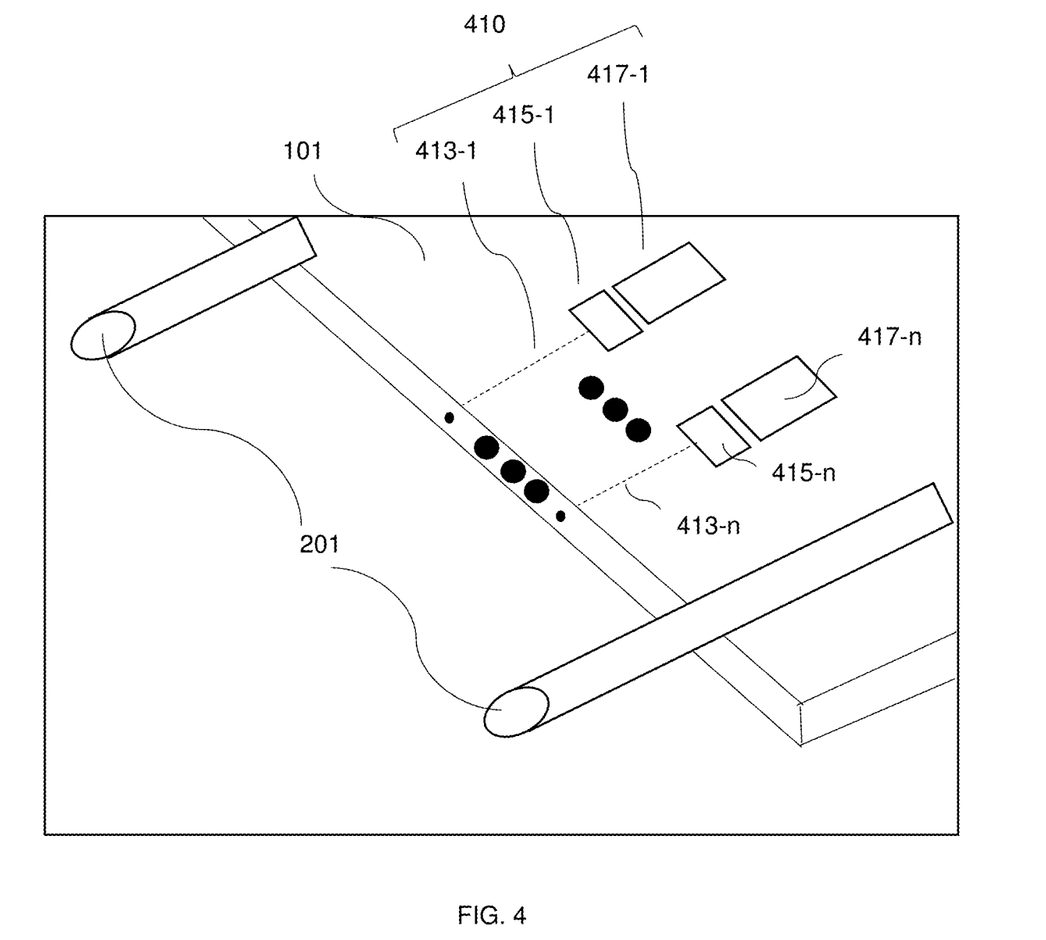
FIG. 4 is a magnified schematic view of the fiberless optical coupler according to some embodiments.

FIG. 4 is an example diagram of a high magnification of the fiberless optical coupler 101 according to an embodiment. The mechanical aligner 201, embodied as a pair of mechanical alignment rods are included on the fiberless optical coupler 101. The fiberless optical coupler 101 also includes wafer-level optical elements 410. Based on the description below, these optical elements 410 may be "self-aligning."

In an embodiment, the optical elements 410 may include a plurality of waveguides 413-1 through 413-n (collectively referred to as a waveguide 413 or waveguides), deflectors 415-1 through 415-n (collectively referred to as a deflector 415 or deflectors 415) and curved mirrors 417-1 through 417-n (collectively referred to as a curved mirror 417 or curved mirrors 417). The optical elements 410 may be arranged between the mechanical alignment rods within the fiberless optical coupler 101, and are arranged to guide light waves to and from the fiber array (not shown) and elements, the details of which will be further described in FIG. 5.

It is noted that other types of mechanisms besides mechanical alignment rods may be used to ensure alignment. An example of such an alternative embodiment will be discussed with respect to FIG. 8.

Figure 5:
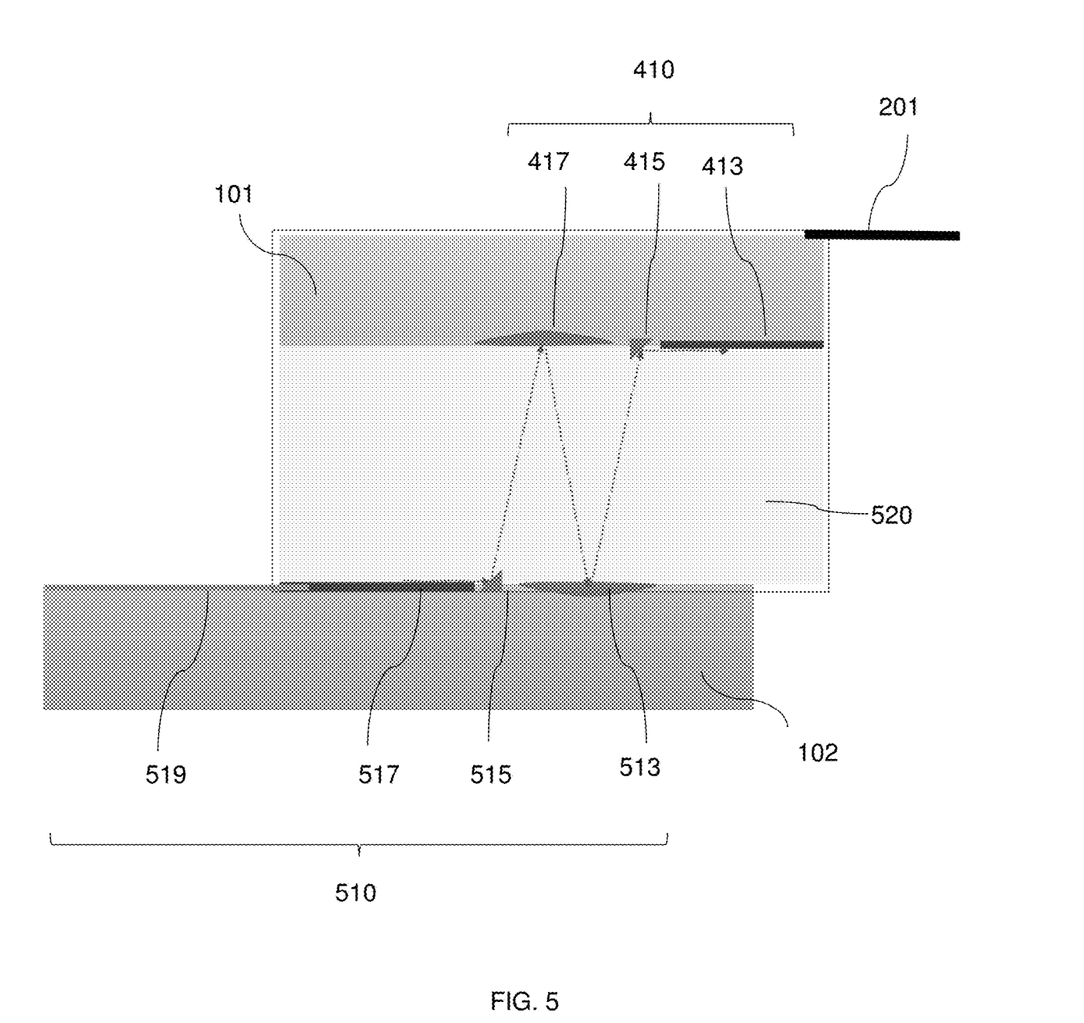
FIG. 5 is a schematic side view of the fiberless optical coupler on the Photonic Integrated Circuit (PIC) according to some embodiments.

FIG. 5 is a schematic side view of the fiberless optical coupler 101 on the PIC 102 according to an embodiment. The fiberless optical coupler 101 includes the optical elements 410, which may include the waveguide 413, the deflector 415, and the curved mirror 417.

The waveguide 413 may be a polymeric or a silicon (Si) waveguide. When polymer is used for the waveguide 413, the polymer may be designed to match the single-mode fiber optics in terms of mode diameter. Also, the deflector 415 may be a reflective surface, preferably a tilted reflective surface.

The PIC 102 includes a second plurality of optical elements 510 for coupling with the wafer-level optics elements 410 of the fiberless optical coupler 101. The second plurality of optical elements 510 includes a curved mirror 513, a deflector 515, and a tapered polymer waveguide 517. In an embodiment, a silicon waveguide 517 may be used. The PIC 102 can also include an additional polymeric or a silicon waveguide 519. In some embodiments, the waveguide 519 may be coupled to the tapered polymer waveguide 517.

Optical elements 410, 510 may be "self-aligning," in the sense that the components of the optical elements 410, 510 are adjustable so that the beams of light are properly guided by the components from waveguide 201 to waveguide 519, and vice-versa. That is, the corresponding deflectors 415, 515, and curved mirrors 417, 513 within the respective fiberless optical coupler 101 and PIC 102 may be individually movable to adjust the path of the light beam from either the waveguide 201 or 519, to account for slight misalignment of the components during the manufacturing process. Therefore, adjustment of the optical elements 410, 510 allows for slight tolerance for misalignment during manufacturing.

Additionally, a spacer 520 may be included in between the fiberless optical coupler 101 and the PIC 102, for light from the waveguides 201, 517 to travel through after being reflected by the corresponding deflectors 415, 515 and curved mirrors 417, 513. The spacer 520 may be made of a transparent and non-conductive material, such as glass, polydimethylsiloxane, air, or any other index matching materials. The height of the spacer 520 determines, in part, the efficiency of the light beam (optical signal) that propagates through the spacer 520. In an exemplary and non-limiting embodiment, the height of the spacer 520 may be about 300 microns.

Figure 6:
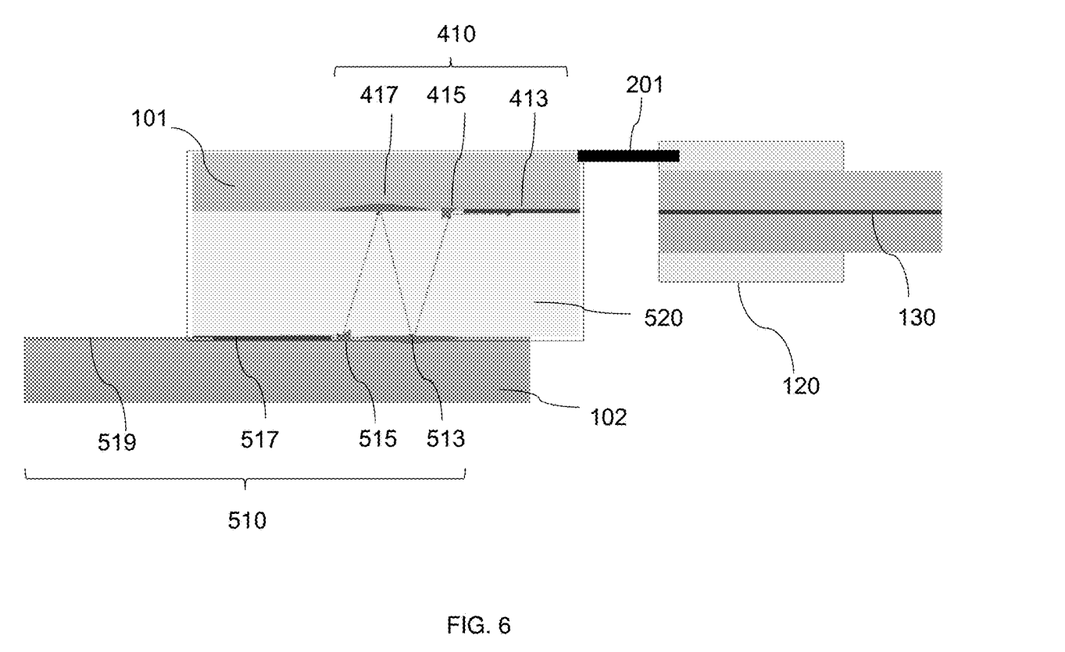
FIG. 6 is a schematic side view of a PIC mounted with a fiberless optical coupler that is attached to a fiber array according to some embodiments.

FIG. 6 is a schematic side view of the fiberless optical coupler 101 on the PIC that is attached to the fiber array 130, according to an embodiment. Here, the various components of the fiberless optical coupler 101, PIC, 102, and the spacer are substantially the same as that shown in FIG. 5, with the spacer 520. The fiberless optical coupler 101 is coupled to the optical connector 120 via the mechanical aligner 201, which houses the end tips of the fiber array 130.

The mechanical aligner 201 is arranged so that when the aligner 201 is inserted into the optical connector 120, the fiber array 130 is accurately aligned to the polymeric waveguide 413 with the same beam mode size within the fiberless optical coupler 101, with a space defined by the length of the mechanical aligner 201 in between the fiberless optical coupler 101 and the optical connector 120.

In an embodiment, the positioning of the mirrors 417, 513, and the deflectors, 415, 515 can be performed using a wafer level process such as, but not limited to, grayscale lithography. The mirrors 417 and 513, are placed and created during fabrication, which ensures high accuracy positioning and accurate reflective mirrors. For example, the curved mirror 417, deflector 415, and waveguide 413 are all placed by wafer level process with high accuracy. On the PIC 102 side, waveguide 517, deflector 515, and curved mirror 513 are accurately placed by wafer level process.

As a non-limiting example, the fabrication process utilized to create the mirrors may include wafer level imprint lithography, and may include the use of a Silicon-On-Insulator (SOI), and Complementary Metal-Oxide Semiconductor (CMOS).

Figure 7:
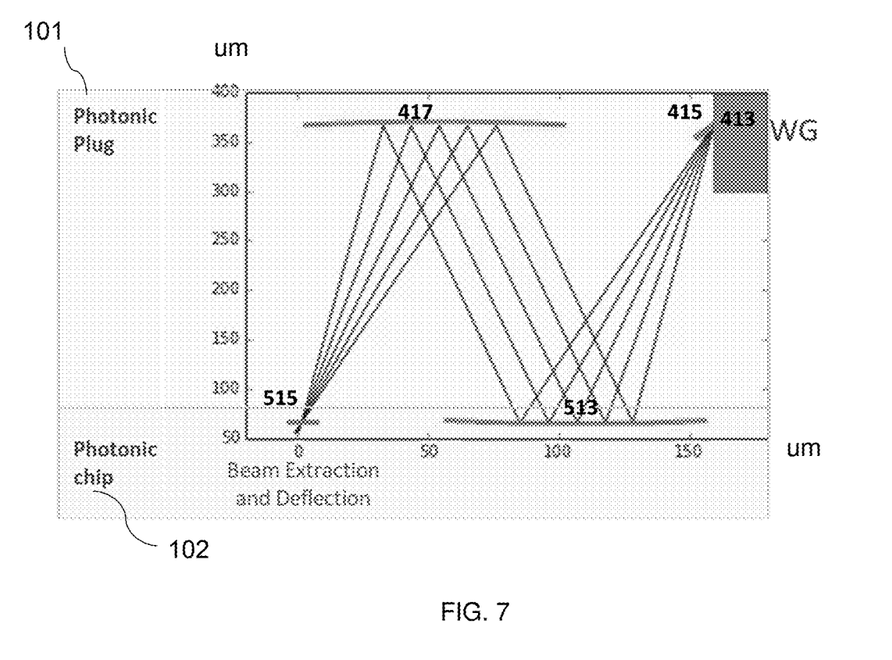
FIG. 7 is a magnified schematic side view of the self-aligning optics according to some embodiments.

FIG. 7 is an example magnified schematic side view of the self-aligning optics, according to an embodiment. Here, the waveguide 413, the deflector 415, and the curved mirror 417 within the fiberless optical coupler 101, which is herein described as a Photonic Plug (PP), and the curved mirror 513 and the deflector 515 within the PIC 102, which is herein described as the photonic chip, are arranged in substantially the same way as that described in FIG. 5 and FIG. 6.

In an embodiment, as light beam is received at the waveguide 413 within the fiberless optical coupler 101 side, it is expanded and redirected by the deflector 415 at an angle to the curved mirror 513 at the PIC 102 side through a medium (not shown). The curved mirror 513 receives the expanded light beam and reflects the expanded light beam to the curved mirror 417 on back on the fiberless optical coupler 101 side. The curved mirror 417 then further reflects the expanded light beam to the deflector 515 back on the PIC 102 side, where the expanded light beam is collimated and further processed by the PIC 102.

The arrangement described above allows for the separation of the fiber array 130 from the PIC 102, thereby gaining high and relaxed alignment tolerances between the fiberless optical coupler 101 and PIC 102 (in three-dimensions). Also, the scalability of the disclosed fiberless optical coupler 101 is achieved due to its optical arrangement that provides high tolerance alignment and a passive positioning of the fiberless optical coupler 101, thus aligning the optical fiber with respect to the PIC. Therefore, the disclosed fiberless optical coupler 101 can be mass-produced. In certain embodiments, the disclosed fiberless optical coupler 101 further allows for compact and secured packaging of PICs.

Figure 8:
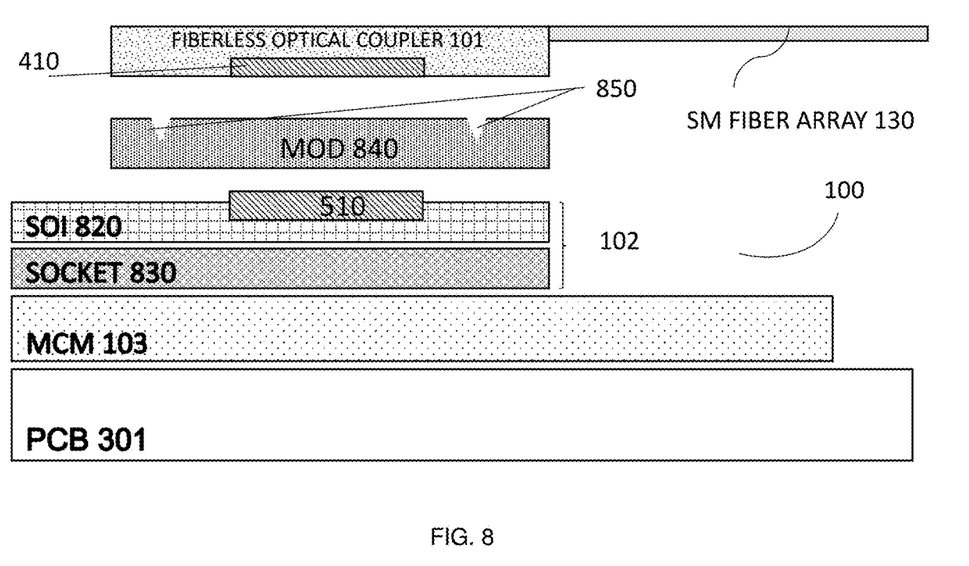
FIG. 8 is a schematic side view of the electro-optical interconnection platform according to some embodiments.

FIG. 8 is a schematic side view of the electro-optical interconnection platform 100 according to an embodiment. An MCM 103 is shown along with the PIC 102 including an SOI wafer 820 mounted on a socket 830, the socket 310 being coupled to the MCM 103. The fiberless optical coupler 101 is located on the PIC 102, with the fiberless optical coupler 101 coupled to the fiber array 130. The fiberless optical coupler 101 includes a first set of optical elements 410, and the SOI wafer 820 includes a second set of optical elements 510. Each of the first and second sets of the optical elements 410, 450 have similar components as described in FIGS. 4 and 5.

In an embodiment, the mechanical aligner 201 previously described in FIG. 1 is configured as a Mechanical Optical Device (MOD) 840 located between the fiberless optical coupler 101 and the PIC 102. The first set of optical elements 410 and the second set of optical elements 510 are aligned with the fiber array 130, via the MOD 840, in order for light to transmit in between the fiber array 130 and the PIC 102 through the sets of the optical elements 410, 510.

In the embodiment, the MOD 840 allows light to pass through between the sets of the optical elements 410, 510 within the fiberless optical coupler 101 and the PIC 102. Also, the MOD 840 further includes V-shaped grooves 850 that receive the fiberless optical coupler 101, so that the optical elements 410, 510 are in alignment with the fiber array 130 when receiving light transmitted to and from the fiber array 130. That is, the V-shaped grooves 850 ensures a later aligned placement of additional optical elements 410 included in the fiberless optical coupler 101.

Also, the optical elements 510 may be formed on the SOI wafer 820 as a bump via a wafer level process, and may include various expansion and collimating optics, including the mirror 513, deflector 515, and waveguide 517 described in FIG. 5.

Figure 9:
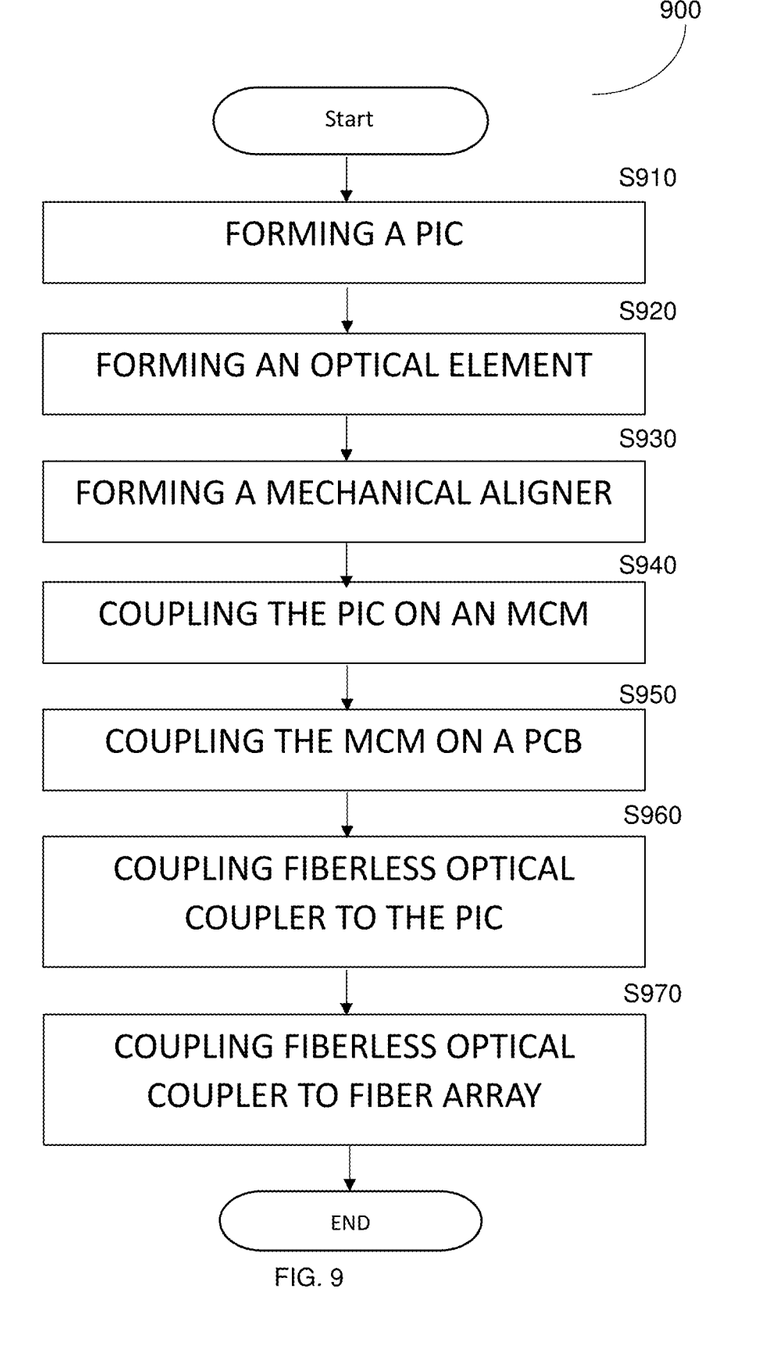
FIG. 9 is a flowchart of a method of manufacturing an electro-optical interconnection platform according to some embodiments.

FIG. 9 is an example flowchart 900 of a method of manufacturing an electro-optical interconnection platform 100, according to an embodiment. At S910, the PIC 102 is formed, in which the laser source 116 is also formed on the PIC 102. Next, at S920, the second optical elements 510 are formed on the PIC 102, while the optical elements 410 are separately formed on the fiberless optical coupler 101. Further, at S940, a mechanical aligner 201 is formed.

Additionally, at S940, the PIC 102 is coupled on the MCM 103, and at S950, the MCM 103 is coupled on the PCB 301. Next, at S960, the fiberless optical coupler 101 is coupled to the PIC 102, and at S970, the fiberless optical coupler 101 is coupled to the fiber array 130.

With the method 900 above, a flip-chip assembly process may be used to employed to couple components of the PIC 102 together (e.g., coupling SOI wafer with the socket) and with other elements, and coupling the mechanical aligner 201 to the PIC 102 or the fiberless optical coupler 101. This ensures accurate placement of the optics on the PIC 102. Also, when the MOD 840 is used, additional accuracy in aligning optical elements 410, 510, along with added optical functionality of the MOD 840 may be achieved.

Figure 10:
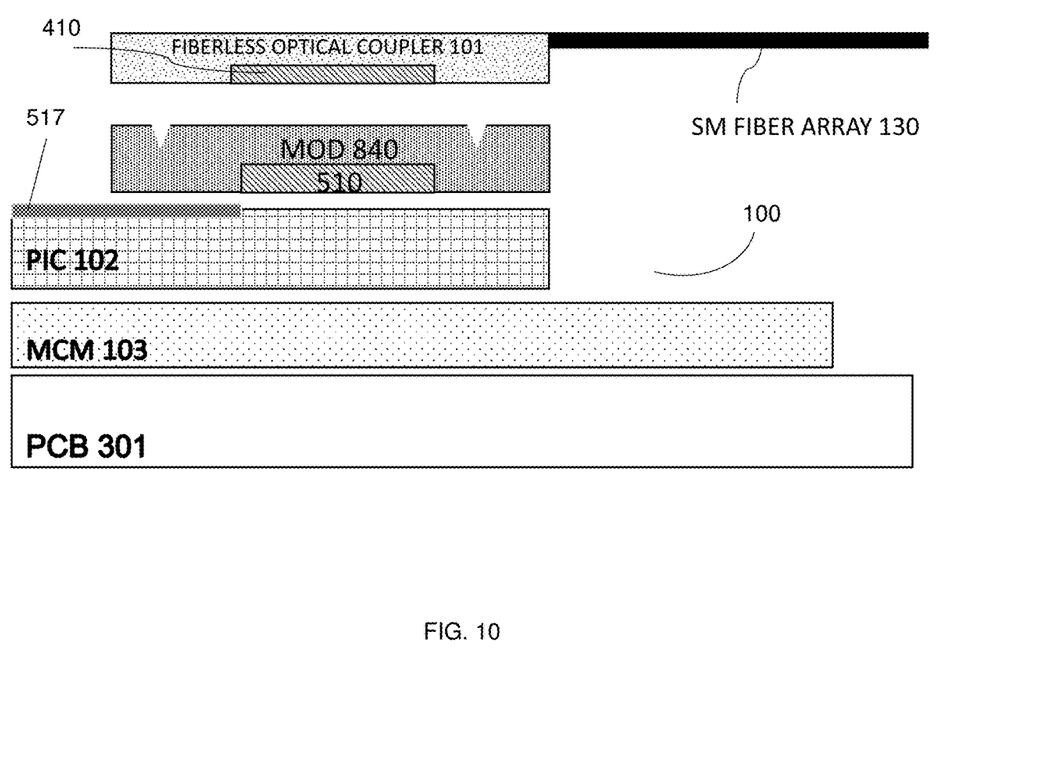
FIG. 10 is a schematic side view of the electro-optical interconnection platform according to some embodiments.

FIG. 10 is a schematic side view of the electro-optical interconnection platform 100 according to an embodiment. Here, the components of the platform 100 are arranged in substantially the same way as depicted in FIG. 8. However, the optical elements 510 that were previously located within the PIC 102 are instead formed within the MOD 840. By having the optical elements 510 formed in the MOD 840, further alignment of the optical components may be assured, and the MOD 840 may be given additional optical functionality besides being just a medium or spacer that provides merely mechanical alignment between the various optical elements 410, 510 and the fiber array 130.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. An electro-optical system, comprising:
   a Photonic Integrated Circuit (PIC) having a laser source located on the PIC;
   a photonic plug located on the PIC, wherein the photonic plug is configured to be coupled to a fiber array;
   an optical element; and
   a mechanical aligner, wherein the optical element is aligned with the fiber array, via the mechanical aligner, for a light from the laser source to transmit in between the fiber array and the PIC via the optical element, when the photonic plug is coupled to the fiber array, wherein the optical element comprises:
   a first plurality of optical elements located in the photonic plug; and
   a second plurality of optical elements located in the PIC; and wherein the first plurality of optical elements includes a first waveguide, a first deflector, and a first mirror, and the second plurality of optical elements includes a second waveguide, a second deflector, and a second mirror.

2. The electro-optical system of claim 1, further comprising:
a Multi-Chip Module (MCM), wherein the PIC is located on the MCM.

3. The electro-optical system of claim 1, further comprising:
an optical connector, wherein the fiber array is located in the optical connector, and the optical connector is coupled to the mechanical aligner to align the optical element with the fiber array.

4. The electro-optical system of claim 3, wherein the mechanical aligner further comprises:
a plurality of mechanical alignment rods located within the photonic plug and connectible to the optical connector.

5. The electro-optical system of claim 1, wherein the first deflector, the first mirror, the second deflector, and the second mirror are adjustable to direct the light from the laser source to the first waveguide.

6. The electro-optical system of claim 1, wherein the mechanical aligner is located in between the photonic plug and the PIC.

7. The electro-optical system of claim 6, wherein the mechanical aligner is at least a Mechanical Optical Device (MOD), wherein the MOD allows light to pass between the photonic plug and the PIC.

8. The electro-optical system of claim 7, wherein the MOD further includes grooves that are configured to receive the photonic plug so that the optical element is aligned to the fiber array, and the light from the laser source is transmitted to the fiber array through the optical element.

9. The electro-optical system of claim 6, wherein the PIC further comprises:
a Silicon-On-Insulator (SOI) wafer that is coupled to the mechanical aligner; and
a socket coupled to a Multi-Chip Module (MCM), wherein the PIC is located on the MCM, wherein
the optical element comprises a first plurality of optical elements located in the photonic plug, and a second plurality of optical elements located in the SOI wafer.

10. The electro-optical system of claim 5, wherein at least one of the first waveguide and the second waveguide is a polymeric waveguide.

11. The electro-optical system of claim 5, wherein at least one of the first waveguide and the second waveguide is an Si waveguide.

12. An electro-optical system, comprising:
a Photonic Integrated Circuit (PIC) having a laser source located on the PIC;
a photonic plug coupled to the PIC, wherein the photonic plug is configured to be coupled to a fiber array;
an optical element; and
a mechanical aligner, wherein the optical element is aligned with the fiber array, via the mechanical aligner, for a light from the laser source to transmit in between the fiber array and the PIC via the optical element, when the photonic plug is coupled to the fiber array;
wherein the light is reflected at least twice at each of the PIC and the photonic plug while passing between the fiber array and the PIC.

13. The electro-optical system of claim 12, wherein the optical element comprises:
a first plurality of optical elements located in the photonic plug; and
a second plurality of optical elements located in the PIC.

14. The electro-optical system of claim 13, wherein the first plurality of optical elements includes a first waveguide, a first deflector, and a first mirror, and the second plurality of optical elements includes a second waveguide, a second deflector, and a second mirror.

15. The electro-optical system of claim 14, wherein at least one of the first deflector, the first mirror, the second deflector, and the second mirror is adjustable to direct the light from the laser source to the first waveguide.

16. The electro-optical system of claim 14, wherein at least one of the first waveguide and the second waveguide is one of the group consisting of: a polymeric waveguide and an Si waveguide.

17. The electro-optical system of claim 12, wherein the PIC and the photonic plug are offset from each other by virtue of being in different planes.

* * * * *